(12) United States Patent
Ejzak

(10) Patent No.: US 7,301,938 B2
(45) Date of Patent: Nov. 27, 2007

(54) METHOD OF TRANSFERRING A PACKET SWITCHED TO A CIRCUIT SWITCHED CALL

(75) Inventor: Richard Paul Ejzak, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 215 days.

(21) Appl. No.: 10/823,580

(22) Filed: Apr. 14, 2004

(65) Prior Publication Data

US 2005/0245263 A1    Nov. 3, 2005

(51) Int. Cl.
*H04L 12/66* (2006.01)
*H04Q 7/20* (2006.01)
*G06F 15/16* (2006.01)

(52) U.S. Cl. .............. 370/352; 455/445; 370/902; 709/227

(58) Field of Classification Search .......... 370/352; 379/900, 902; 709/227; 455/445
See application file for complete search history.

(56) References Cited

U.S. PATENT DOCUMENTS

| 2003/0027595 | A1* | 2/2003 | Ejzak ................. 455/560 |
| 2003/0134638 | A1* | 7/2003 | Sundar et al. .......... 455/435 |
| 2004/0008669 | A1* | 1/2004 | Bos et al. ............. 370/352 |
| 2004/0190498 | A1* | 9/2004 | Kallio et al. .......... 370/352 |
| 2004/0264410 | A1* | 12/2004 | Sagi et al. ............ 370/331 |
| 2005/0083909 | A1* | 4/2005 | Kuusinen et al. ....... 370/352 |
| 2005/0227691 | A1* | 10/2005 | Pecen et al. ......... 455/435.2 |
| 2006/0140151 | A1* | 6/2006 | Dantu et al. .......... 370/331 |

FOREIGN PATENT DOCUMENTS

EP        1182900 A1 *  2/2002

* cited by examiner

*Primary Examiner*—William Trost
*Assistant Examiner*—Ariel Balaoing

(57) ABSTRACT

In the method, a packet call controller establishes a bearer path between the end point and the second network when a call transfer request associated with the mobile station is received from a network providing circuit switched communication. The call transfer request is triggered by a circuit voice call origination from the mobile station that includes an identifier that the packet call controller uses in recognizing that the call transfer request requests transfer of a packet switched call to a circuit switched call on the network.

21 Claims, 2 Drawing Sheets

METHOD OF TRANSFERRING A PACKET SWITCHED TO A CIRCUIT SWITCHED CALL

BACKGROUND OF THE INVENTION

1. Field the of the Invention

The present invention relates to telecommunication; and more particularly, methods for transferring packet switched communication to circuit switched.

2. Description of Related Art

When a mobile station moves within a wireless network, one communication station (e.g., base station, etc.) may transfer (e.g., according to well-known call handoff procedures) the communication needs of the mobile station to another communication station in the network. To the mobile station user, this transition is seamless in that the communication from and to the mobile station is substantially uninterrupted.

However, no mechanism currently exists for providing such a seamless transition when the mobile station moves from a network or portion of a network providing packet switched communication (e.g., Voice-over-IP or VoIP) to a different network or portion of a same network that cannot maintain a packet switched call, for example, due to unavailability of appropriate network resources for packet switch communication, but including appropriate resources for circuit switched. This situation is expected to be common during a transition period while packet switched systems with sufficient QoS support are being deployed but are not yet available ubiquitously. Currently, the packet switched call must be terminated, and a separate circuit switched call manually established on the second network. As a result, a significant gap in communication flow with the mobile station occurs. In some cases it may not even be possible to establish another call between the same parties from a circuit switched network, for example, when the end point in the packet switched network is not known by or associated with a telephone number.

SUMMARY OF THE INVENTION

The present invention provides methods of transferring a packet switched call carried over a first network to a circuit switched call carried over a second network.

In one exemplary embodiment, a packet call controller establishes a bearer path between the end point and the second network when a call transfer request associated with the mobile station is received from the second network.

In one embodiment, the call transfer request is a call request (e.g., a SIP INVITE request) including an identifier provided by the mobile station that identifies the call request as a call transfer request. For example, the identifier may be a public identifier provided for use by mobile stations to request call transfer of an ongoing packet switched call. As another example, the identifier may be a unique identifier associated with the mobile station for use in requesting call transfer of an ongoing packet switched call. Here, the unique identifier may be a public telecommunication number assigned to the mobile station for use in the second network.

When the packet call controller receives the call transfer request, the packet call controller sends a call control request to the end point communicating with the mobile station in the packet switched call. The call control request requests the end point to agree to transition the packet call controller from a call control agent for the first call control path from the first network to the end point to a call control agent for a second call control path from the second network to the end point. If the end point agrees, the packet call controller, as the call control agent, sets up a bearer path for the second call control path.

In one exemplary embodiment, the call control request is a SIP re-INVITE request.

The present invention provides for transferring a packet switched call to a circuit switched call without first terminating the packet switched call. As a result, the transition takes place quickly without requiring the user to manually re-establish the call. This invention has utility in any system that cannot maintain a packet switched call due to unavailability of appropriate network resources whereas circuit switched capability does exist.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF EMBODIMENTS

For purposes of explanation only, the embodiments of the present invention will use the example of transferring a packet switched call (e.g., a Voice-over-IP or VoIP call) carried over a cdma2000 3G1X-EVDO based network (hereinafter the DO network) to circuit switched call carried over a cdma2000 3G1X-EVDV based network (hereinafter the DV network).

Figure 1:
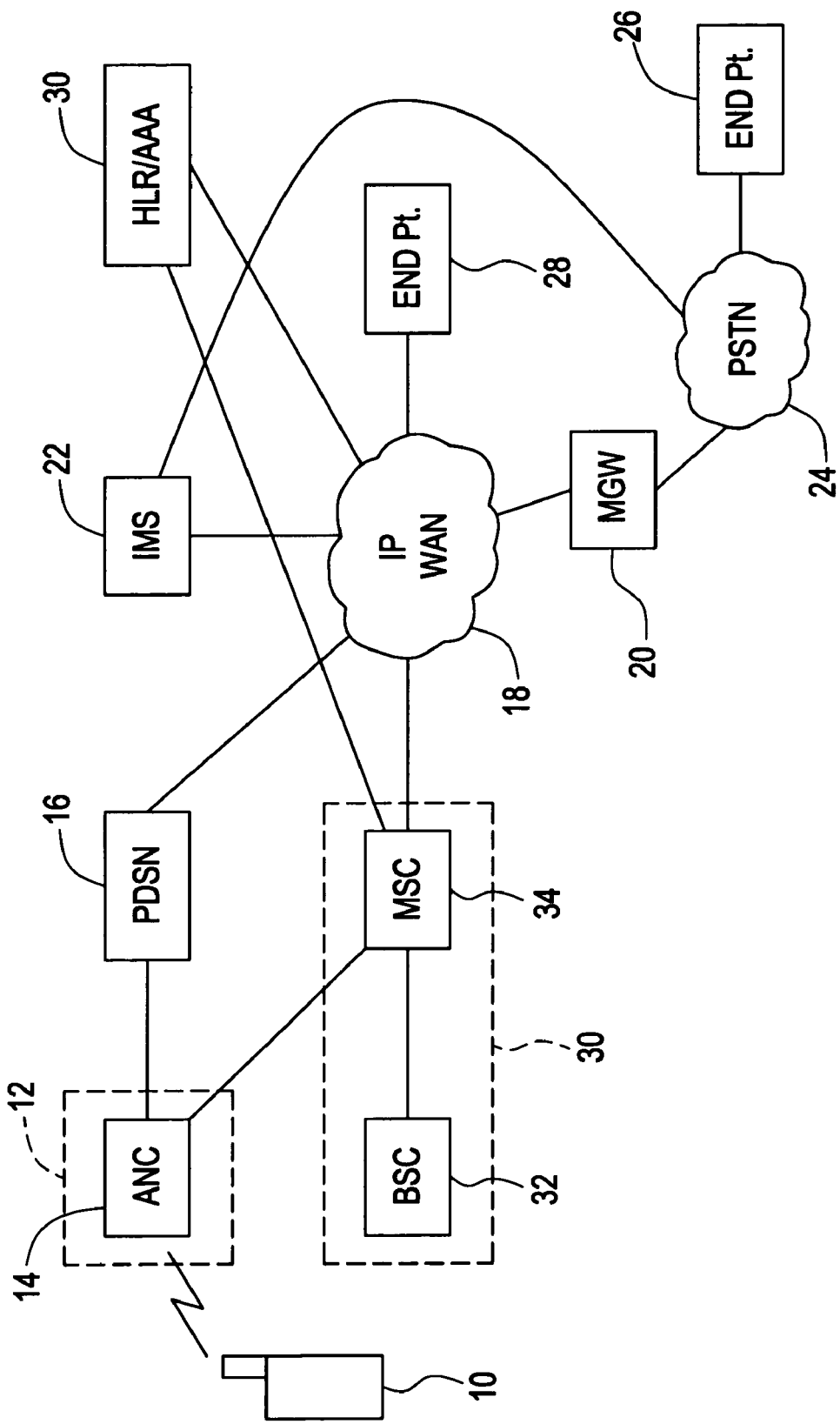
FIG. 1 illustrates a system architecture of a cdma2000 3G1X-EVDO network and a cdma2000 3G1X-EVDV network and their relationship with a packet call controller (e.g., an IP multimedia subsystem (IMS) as shown)

FIG. 1 illustrates a system architecture of a cdma2000 3G1X-EVDO network and a cdma2000 3G1X-EVDV network and their relationship with a packet call controller (e.g., an IP multimedia subsystem (IMS) as shown). As shown, a mobile station or user equipment (UE) 10 communicates with a high rate packet data (HRPD) access network controller (ANC) 14 in a DO network 12. The terms mobile station and user equipment will be used interchangeably and generically throughout this application as any device (phone, PDA, computer, etc.) capable of wireless communication, and should not be interpreted as limited to a particular standard. The mobile station 10 supports the air interface signaling for both the DO network 12 and the DV network 30 (discussed below), and supports the ability to transition from a stable VoIP call state to a stable circuit voice call state after originating a circuit switched voice call on the DV network. Also, as will be appreciated, a DO network 12 includes many more aspects than the HRPD ANC 14; however, for purposes of clarity, these other elements have not been shown.

The HRPD ANC 14 sends the VoIP bearer traffic received from the mobile station 10 to a packet data serving node (PDSN) 16. The PDSN 16 routes the VoIP bearer traffic to an end point 28 over an IP wide area network (WAN) 18. The end point 28 may be a computer connected to the internet, a VoIP phone directly connected to the IP WAN 18, another mobile station connected to the IP WAN 18 in the same or similar manner that mobile station 10 is connected, etc. Alternatively, the VoIP bearer traffic is routed to a media gateway (MGW) 20. The MGW 20 converts the VoIP bearer traffic to a suitable communication format for a public switched telephone network (PTSN), and routes the converted voice call over a PSTN 24. The PSTN 24 connects the call to an end point 26 such as a telephone connected to the PSTN 24. For purposes of explanation only, the VoIP session will be described as being between the mobile station 10 and the end point 28. The call control path between the mobile station 10 and the end point 28 traverses the HRPD ANC 14, the PDSN 16, the IP WAN 18, and the IMS 22. The call control path between the mobile station 10 and the end point 26 traverses the HRPD ANC 14, the PDSN 16, the IP WAN 18, the IMS 22, and the PSTN 24. The HRPD ANC 14, the PDSN 16, and the IP WAN 18 support transport of IP packets with the appropriate quality of service (QoS) and do not otherwise influence signaling messages on the call control path or bearer traffic on the bearer path.

The routing within the IP WAN 18 is managed by a packet call controller such as a IP multimedia subsystem (IMS) 22 as defined in 3GPP TS 23.228 and related specifications, and shown in FIG. 1. According to an embodiment of the present invention, the IMS 22 serves as a proxy for the SIP signaling related to the VoIP session between the mobile station 10 and the end point 28. Throughout this disclosure, examples of SIP signaling are according to the well-known SIP protocol version 2.0, defined in IETF RFC 3261 and related specifications.

FIG. 1 further shows a DV network 30 and associated connections with the architecture described above. As shown, the DV network 30, like the DO network 14, includes a network controller—a base station controller (BSC) 32 that may provide communication services to the mobile station 10. A BSC is the DV network counterpart to an ANC in a DO network. The BSC 32 provides for routing circuit switched call traffic to a circuit switching controller—a mobile switching center (MSC) 34. Because a DO network does not provide circuit switched communication, no counterpart to the MSC exists in a DO network. The MSC 34 manages operation of the BSC 32, and also provides for routing circuit switched traffic from the BSC 32 to the IP WAN 18 by performing interworking between circuit switched call control signaling and bearer traffic within the DV network 30 and the VoIP call control signaling and VoIP bearer traffic within the IMS 22 and IP WAN 18. The MSC 34 has IP interfaces for SIP signaling and voice media with the IP WAN 18 and the IMS 22.

The home location register & authentication, authorization and accounting server (HLR/AAA) 30 shown in FIG. 1, also known as a home subscriber server (HSS), is the repository of subscriber-related data such as defined in the 3GPP or 3GPP2 standards.

Next, an embodiment of the method according to the present invention will be described with respect to the architecture of FIG. 1 and the call flow diagram illustrated in FIG. 2. A UE 10 registers, in the conventional manner, with the DO network 12, the PDSN 16 and the IMS 22 (not shown). Afterwards, a VoIP call over the DO network 12 may be established in the conventional manner between the UE 10 and the end point 28 (not shown). During the VoIP call, a call control agent function of the IMS 22 serves as a session-stateful proxy for the SIP signaling related to the VoIP session between the mobile station 10 and the end point 28. In this capacity, the IMS 22 accumulates information regarding the VoIP session such as identification of the end point, identification of the mobile station, etc.

Figure 2:
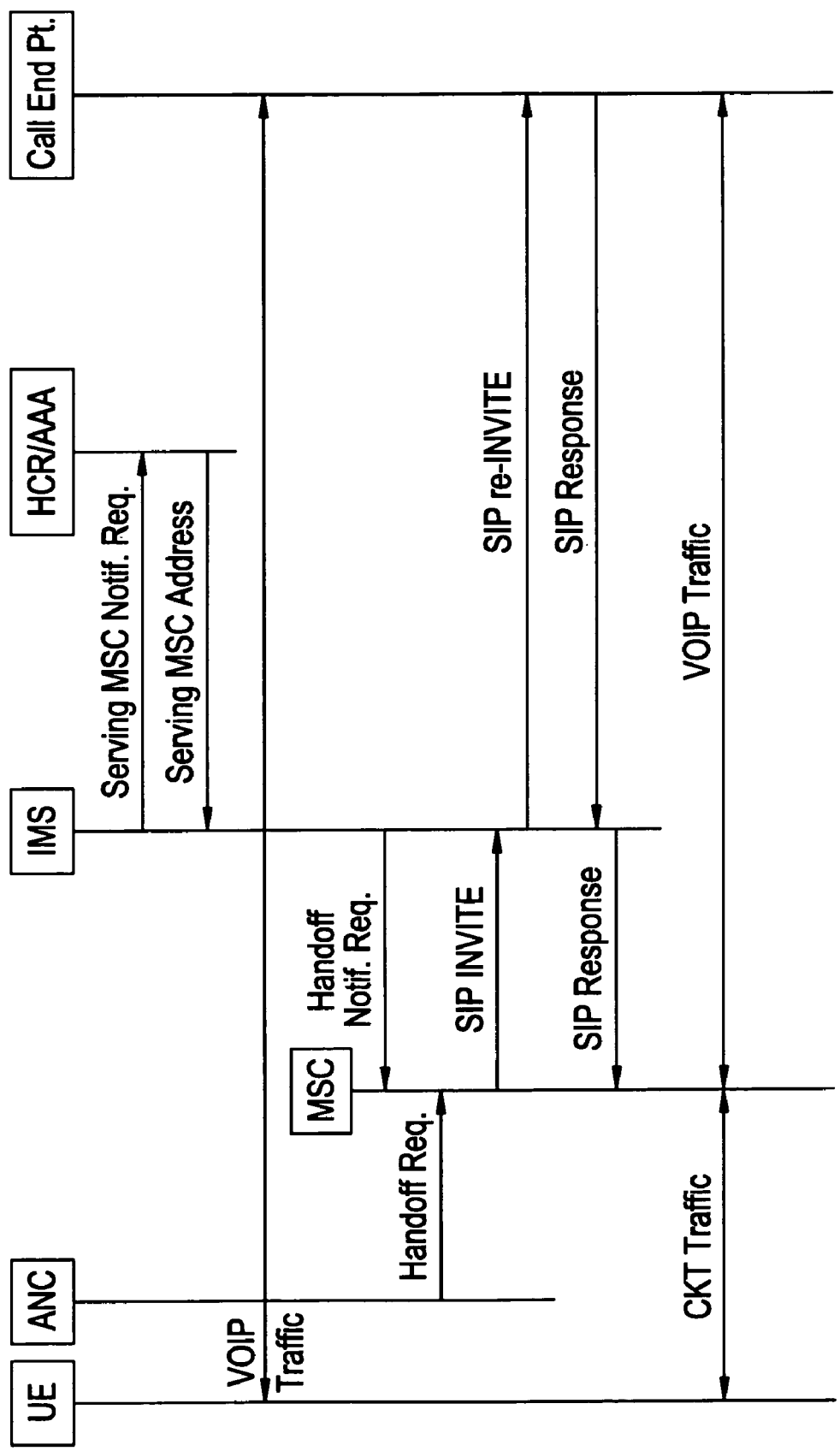
FIG. 2 illustrates a call flow diagram of call flow in the architecture of FIG. 1 according to an example embodiment of the present invention.

As shown in FIG. 2, according to well-known techniques, the UE 10 may decide that the DO network 12 no longer provides acceptable service and that communication over the DV network 30 should take place (e.g., based on the received signal strengths from the DO network 12 and the DV network 30). Accordingly, the UE 10 sends an origination request to the DV network 30. For a UE 10 with a single radio, this may require releasing the VoIP call on the DO network 12, and sending the origination request to the DV network 30. Alternatively, the origination message for the DV network 30 may be sent via the DO network 12 as disclosed in U.S. application Ser. No. 10/823,579, entitled METHOD OF TRANSFERRING CALL TRANSITION MESSAGES BETWEEN NETWORK CONTROLLERS OF DIFFERENT RADIO TECHNOLOGIES, filed Apr. 14, 2004 by inventors of the subject application, the entire contents of which are hereby incorporated by reference. For a dual radio UE 10, the origination request is sent using a second radio while the first radio maintains the VoIP call. Prior to sending the origination request, the UE 10 may have registered with the DV network 30 in the conventional manner, or the UE 10 may register with the DV network 30 in combination with the origination.

As shown in FIG. 2, the origination request is made to a call transfer universal resource identifier (URI) previously provisioned in the UE 10 by the DV network 30. Namely, the called party number in the origination request is the call transfer URI. FIG. 2 only shows the relevant information exchanged during the origination request procedure and other procedures, and does not precisely depict all of the actual messages, since the individual procedures occur in the conventional manner. Upon receiving the origination request, the MSC 24 sends a SIP INVITE request to the IMS 22. As is known, a SIP INVITE request may be used as a form of call request to establish communication between two parties.

The SIP INVITE request includes the call transfer URI provided in the origination request as the Request URI. As a result, the SIP INVITE request is routed to a call transfer function at the IMS 22 for the UE 10. As will be appreciated, the IMS 22 may be comprised of one or more servers with various functional modules operating thereon.

In one embodiment, the call transfer URI is a public identifier provided for use by mobile stations to request call transfer of an ongoing packet switched call. In this embodiment, a service call transfer function at the IMS 22 receives the SIP INVITE request. Recognizing the Request URI as indicating call transfer, the service call transfer function proxies the INVITE request to a subscriber call transfer function at the IMS 22. Namely, the service call transfer function uses the calling party number for the UE 10 included in the origination request and thus in the SIP INVITE request to obtain a public identifier (e.g., public telecommunication number) for the UE 10 in the DV network 30. The calling party number may be a private or public identifier such as a telecommunication number for the UE in the DV network 30. The subscriber call transfer function treats a received SIP INVITE request as a call transfer request when the Request URI is the public identifier of a UE that is involved in a VoIP session.

The IMS 22 knows whether a UE is involved in a VoIP call because the IMS 22 will have proxied the VoIP call. Therefore, because the IMS 22 has proxied the SIP messages for the VoIP session of the UE 10 and the subscriber call transfer function receives the INVITE request with the public identifier of a UE 10 as the request URI, the call transfer function treats the INVITE request as a special case—a call transfer request.

In an alternative embodiment, the Request URI in the origination request and thus the SIP INVITE request sent by the MSC 34 is one of several public identifiers of the UE 10 in the IMS 22. In this embodiment, the SIP INVITE request may be directly routed to the subscriber call transfer function in the IMS 22, and determined to be a call transfer request. As will be appreciated, in this embodiment, the called and calling party numbers of the origination request may be the same if the public identifier of the UE 10 in the IMS 22 that is used in the Request URI is the same as the public identifier of the UE 10 in the DV network 30.

When the IMS 22 determines that a call transfer request has been received for the UE 10, the IMS 22 sends a SIP re-INVITE request to the end point 28. As will be appreciated, because the call control agent within the IMS 22 served as the proxy for SIP signaling in the VoIP call between the UE 10 and the end point 28, the IMS 22 knows to direct the SIP re-INVITE request to the end point 28. Functionally, the SIP re-INVITE request serves to change the role of the IMS 22 with respect to the SIP signaling between the UE 10 and the end point 28. The SIP re-INVITE request requests the end point to agree to transition the IMS 22 from a call control agent (e.g., proxy server) for the call control path from the DO network 12 to a call control agent (e.g., back-to-back user agent) for a call control path from the DV network 30 to the end point 28. The call control agent (i.e., IMS 22), using back-to-back user agent procedures according to IETF RFC 3261, may establish this new call control path by using a target refresh request towards the end point 28 to take over as a call control agent for the mobile station 10 while responding directly to the INVITE request from the MSC 34 to act as the call control agent for the end point 28 towards the MSC 34. Thus the subscriber call transfer function in the IMS 22 acts as call control agent for both remaining portions of the new call control path while interworking the call control procedures between these two portions of the new call control path. The initial call control path from the DO network 12 no longer exists. The initial packet switched call between UE 10 and end point 28 transitions to a circuit switched call within the DV network 30. The DV network 30 and IMS 22 continue to support the exchange of voice media between the UE 10 and end point 28 after the transfer event to the DV network 30 until either party terminates the call using standard call termination procedures. When the call transfer function receives call control signaling indicating that one portion of the new call control path is terminated, it will also terminate the remaining portion of the new call control path.

FIG. 2 illustrates the end point 28 responding to the SIP re-INVITE request according to known SIP procedures. As the call control agent for a call control path from the DV network 30 to the end point 28, the IMS 22 establishes a bearer path from the MSC 34 to the end point 28 over the IP WAN 18 that does not traverse through the IMS 22 according to well-known third party call control procedures for establishing such a bearer path (e.g., ftp://www.ietf.org/internet-drafts/draft-ietf-sipping-3 pcc-06.txt). The MSC interworks the circuit switched call control signaling established between the UE 10 and the MSC 34 with the SIP call control signaling established among the MSC 34, the IMS 22, and the end point 28. The MSC 34 interworks the circuit voice bearer traffic established between the UE 10 and the MSC 34 with the VoIP bearer traffic established between the MSC 34 and the end point 28.

While the present invention has been described using the example of a DO network as the packet switched network and the DV network as an example of the circuit switched network, the present invention is not limited to these two example networks. Instead, the present invention is applicable to any network supporting packet switched calls such as an 802.11 network, etc., and/or any network supporting circuit switched calls such as a 3GPP GSM or 3GPP UMTS. As such, the packet switched network and the circuit switched network may be two different radio networks or technologies, which are part of different or the same subscriber network, where the two parts support different degrees of IP quality of service (QoS). Accordingly, as used through this application and the claims, the term network covers different networks or different network portions of a same network.

The present invention provides for transferring a packet switched call to a circuit switched call without first terminating the packet switched call. As a result, the transition takes place quickly without requiring the user to manually re-establish the call. This invention has utility in any system that cannot maintain a packet switched call due to unavailability of appropriate network resources whereas circuit switched capability does exist. This situation is expected to be common during a transition period while packet switched systems with sufficient QoS support are being deployed but are not yet available ubiquitously.

The invention being thus described, it will be obvious that the same may be varied in many ways. Such variations are not to be regarded as a departure from the spirit and scope of the invention, and all such modifications as would be obvious to one skilled in the art are intended to be included within the scope of the present invention.

We claim:

1. A method of transferring a packet switched call carried over a first network to a circuit switched call carried over a second network, the packet switched call being between a mobile station and an end point, comprising:

establishing, at a packet call controller, a bearer path between the end point and the second network when a call transfer request associated with the mobile station is received from the second network, the establishing step further including sending a call control request to the end point requesting agreement to transition the packet call controller from a call control agent for a first call control path from the first network to the end point to a call control agent for a second call control path from the second network to the end point.

2. The method of claim 1, wherein the call transfer request is a call request including an identifier provided by the mobile station that identifies the call request as a call transfer request.

3. The method of claim 2, wherein the identifier is a public identifier provided for use by mobile stations to request call transfer of an ongoing packet switched call.

4. The method of claim 2, wherein the identifier is a unique identifier associated with the mobile station for use in requesting call transfer of an ongoing packet switched call.

5. The method of claim 4, wherein the unique identifier is a public telecommunication number assigned to the mobile station for use in the second network.

6. The method of claim 3, wherein the call transfer request is a SIP INVITE request.

7. The method of claim 1, wherein the establishing step further comprises:

setting up the bearer path at the packet call controller as the call control agent for the second call control path.

8. The method of claim 1, wherein the control request is a SIP re-INVITE request.

9. The method of claim 8, wherein the call transfer request is a SIP INVITE request.

10. The method of claim 1, wherein the establishing step comprises:
    receiving a SIP INVITE request including a Request URI;
    determining whether the SIP INVITE request requests transfer of the packet switched call on the first network to a circuit switched call on the second network based on the Request URI; and
    setting up the bearer path between the end point and the second network when the determining step determines that the SIP INVITE request does request transfer.

11. The method of claim 10, wherein the determining step determines that the SIP INVITE request does request transfer when the Request URI is a public identifier provided for use by mobile stations to request call transfer of an ongoing packet switched call.

12. The method of claim 10, wherein the determining step determines that the SIP INVITE request does request transfer when the Request URI is a unique identifier associated with the mobile station for use in requesting call transfer of an ongoing packet switched call.

13. The method of claim 10, wherein the establishing step further comprises:
    sending a SIP re-INVITE request to the end point requesting agreement to transition the packet call controller from a call control agent for a first call control path from the first network to the end point to a call control agent for a second call control path from the second network to the end point; and wherein
    the setting up step is performed by the packet call controller as the call control agent for the second call control path.

14. The method of claim 10, further comprising:
    serving as a proxy for the packet switched call prior to the receiving step;
    accumulating information regarding the packet switched call while serving as the proxy; and wherein
    the determining step determines that the SIP INVITE request does request transfer based on at least the accumulated information and the Request URI.

15. A method of transferring a packet switched call carried over a first network to a circuit switched call carried over a second network, comprising:
    sending, from a circuit switching controller of the second network, a call transfer request associated with a mobile station involved in the packet switched call when a call origination request for a circuit switched call on the second network is received; and
    sending a call control request to an end point requesting agreement to transition a call control agent for a first call control oath from the first network to the end point to a call control agent for a second call control path from the second network to the end point.

16. The method of claim 15, wherein the call transfer request is a call request including an identifier identifying the call request as a call transfer request.

17. The method of claim 16, wherein the identifier is a public identifier provided for use by mobile stations to request call transfer of an ongoing packet switched call.

18. The method of claim 16, wherein the identifier is a unique identifier associated with the mobile station for use in requesting call transfer of an ongoing packet switched call.

19. The method of claim 18, wherein the unique identifier is a public telecommunication number assigned to the mobile station for use in the second network.

20. The method of claim 16, wherein the call transfer request is a SIP INVITE request.

21. The method of claim 16, wherein the control request is a SIP re-INVITE request.

* * * * *

UNITED STATES PATENT AND TRADEMARK OFFICE
CERTIFICATE OF CORRECTION

| | |
|---|---|
| PATENT NO. | : 7,301,938 B2 |
| APPLICATION NO. | : 10/823580 |
| DATED | : November 27, 2007 |
| INVENTOR(S) | : Richard Paul Ejzak |

It is certified that error appears in the above-identified patent and that said Letters Patent is hereby corrected as shown below:

Title Page, Item (57) Title & Col. 1, Ln 1-3, to read: METHOD OF TRANSFERRING A PACKET SWITCHED CALL TO A CIRCUIT SWITCHED CALL Signed and Sealed this Eighth Day of April, 2008

JON W. DUDAS
*Director of the United States Patent and Trademark Office*